Patented Aug. 11, 1931

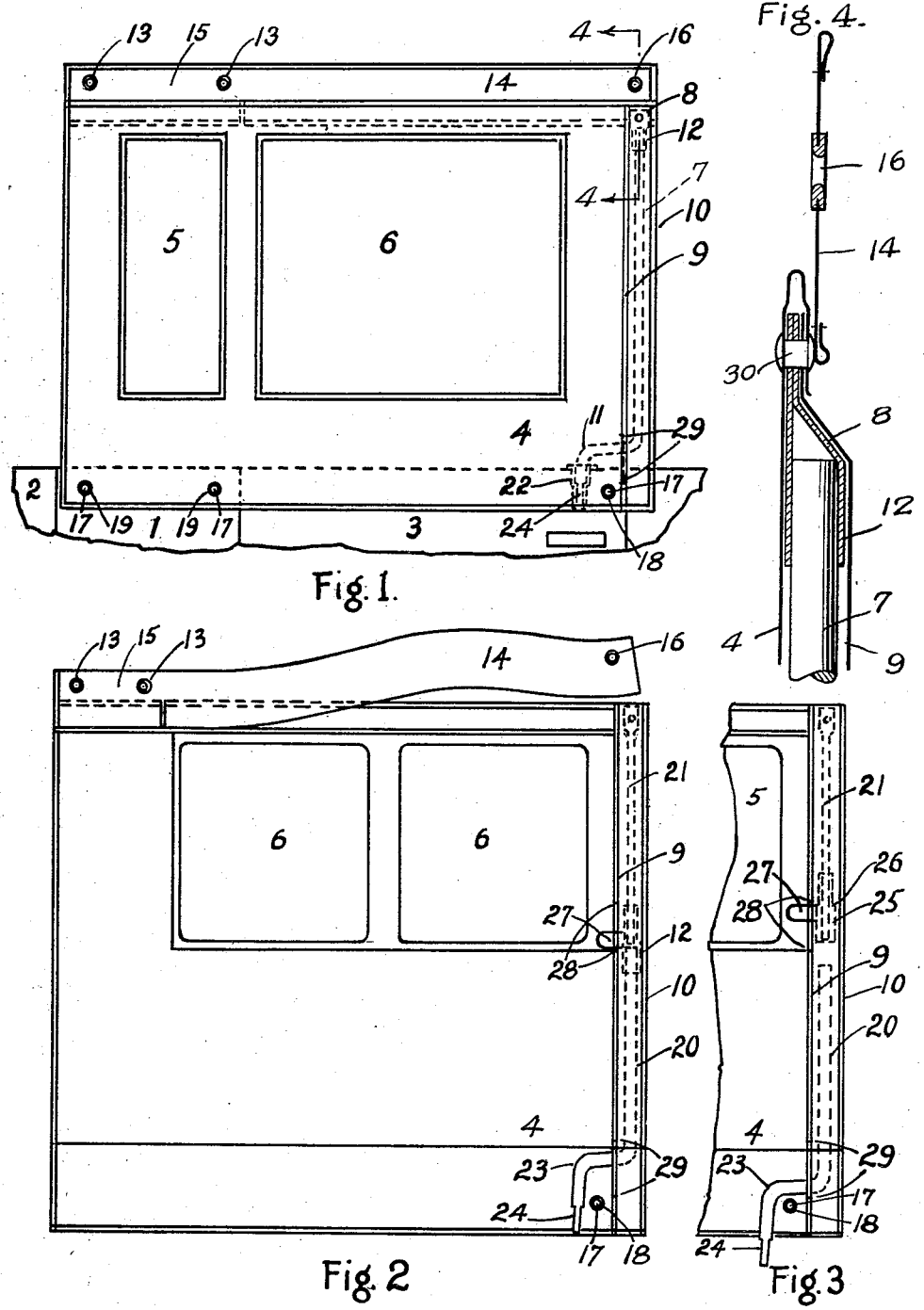

1,818,294

UNITED STATES PATENT OFFICE

GEORGE E. BISHOP, OF CLEVELAND, OHIO

AUTOMOBILE INCLOSURE

Application filed January 18, 1924. Serial No. 686,956.

The subject matter of this application being shown in my application Ser. No. 622,337, filed March 2, 1923, which matured into Patent No. 1,620,003 of March 8, 1927.

My invention relates to automobile side inclosures and particularly to a section of such devices which is mounted upon the automobile door and forms in effect an upper fabric section for the automobile door. More particularly, this invention relates to certain improvements in such an upper fabric section whereby the same is supported and longitudinally stiffened and held in its desired position without the necessity of providing any longitudinal reinforcing rods. The improvements also relate to a vertical two-piece supporting rod which is incorporated with the fabric in a pocket formed in the latter, the lower rod section being formed with an offset adapted to form means properly to support the inclosure upon the automobile door, said lower rod section being so related to the upper rod section that the two sections are adapted to maintain the vertical integrity of the curtain, and yet the lower rod section may be turned relative to the upper section so as to allow the offset section to be turned down flat for storage. Furthermore, the invention includes fabric tensioning means secured to or formed in the fabric and adapted for cooperation with cooperating elements upon the automobile door, the particular means herein disclosed being button eyelets adapted for cooperation with complementary button studs upon the door.

The annexed drawings and the following description set forth in detail certain means embodying my invention, such means constituting, however, but a few of the various forms in which the principle of the invention may be applied.

In said annexed drawings:

Figure 1 represents an outside elevation of one form of my improved inclosure mounted upon an automobile door, the subject matter being shown in my application for U. S. Letters Patent Serial No. 527,963, filed January 9, 1922, which has matured into Patent No. 1,485,012 of February 26, 1924.

Figure 2 represents an inside elevation of another form of my improved inclosure mounted upon an automobile door, the subject matter of this form of disclosure being shown in my application for U. S. Letters Patent Serial No. 622,337, filed March 2, 1923, which has matured into Patent No. 1,620,003 of March 8, 1927.

Figure 3 represents a fragmentary elevation of the last-mentioned inclosure, when certain elements hereinafter fully described are so positioned as to enable the folding of the inclosure into the desired package; and Figure 4 is an enlarged fragmentary vertical section, taken in the plane indicated by the line 4—4, Fig. 1.

Referring to the annexed drawings in in which the same parts are indicated in the several views by the same respective ordinals, I suggest the body of an automobile by the ordinal 1, the same having a front door 2 and rear door 3. Upon the door 3, for instance, I support one of my improved side inclosures comprising suitable fabric 4 adapted exteriorly to overlap the top of the door 3 and provided with front and rear transparencies 5 and 6, respectively, Figure 1, disposed laterally of the door heading and in the door heading, as plainly shown in said figure. For supporting the inclosure I provide a two-piece vertical rod, the same consisting in Figure 1, of a lower section 7 and an upper section 8 having normally abutting ends. In the form of inclosure shown in Figure 1, the upper rod section 8 is in the form of a comparatively short tip section, but the same may be reasonably extended, as desired, within the spirit of the invention. These two rod sections 7 and 8 are contained within a vertical pocket 9 formed in the fabric 4, somewhere between the vertical projection of the supporting section 11 of the rod 7 and the closing edge 10 of the inclosure, and in Figure 1 is shown as formed adjacent the closing edge 10. This pocket 9 is a blinded sheath having its blind end at the top, and in the form of device shown in Figure 1, the upper end portion of the rod 7 is disposed adjacent the blind end of the sheath 9. The portion 11 of the rod section 7 is an offset member whereby the same can be properly mounted upon the automobile door 2. The upper tip section 8, which is formed with an enlarged head, is pivotally secured by rivet 30 to the fabric 4 adjacent the upper edge of the latter and serves both to stiffen and strengthen the fabric longitudinally and to prevent the rod section 7 from perforating the fabric at the top. The upper end of this tip section lies intermediate the top end of the rod section 7 and the blind end of the sheath pocket 9 and forms a metallic protector cap for the said top end of the rod section 7, said upper tip section 8 being formed with a hood member 12 whose axis is disposed substantially parallel to the axis of the rod section 7, which hood member 12 forms a bearing adapted to receive the upper end of the lower rod section 7 and permits the turning of the latter therein. This connection between the rod 7 and the upper tip section 8 serves to maintain the rod sections relatively rigid in the direction of their length and also allows for the turning of the lower rod section 7 relative to the upper tip section 8, after the inclosure is removed from the socket 22 formed in the door 3 and within which the supporting end 11 of the rod section 7 is mounted. This relative turning of the rod section 7 permits it to be turned down flat with the fabric 4, for storage purposes, and also permits the supporting rod sections to adapt themselves to the angle of the natural draw of the fabric.

I provide means for supporting the hinge side of the inclosure and the same are preferably button eyelets 13 cooperating with the usual button studs secured to the automobile canopy. Preferably, I combine the supporting means for the hinge side of the curtain with my improved valance which is shown and described by me in previous patent applications and is particularly patented to me in U. S. Patent No. 1,244,692. This valance consists of a portion 14 disposed above the door heading, and separable from the portion of the inclosure adjacently below, as the inclosure is carried in and out with the door, and a portion 15 disposed laterally of the door heading and integrally secured to the closure portion immediately below, all as plainly shown in the accompanying drawings. The valance portion 14 serves as a bumper for the door section of the curtain when the same is closed. The valance is secured to the canopy frame by means of a button element 16 formed in the bumper portion 14 of the valance and the button elements 13 formed in the lateral valance portion 15. Thus the hinge side of the inclosure is supported from the canopy through the medium of the valance.

I provide the lower edge of the closure with tensioning means for holding the inclosure in its proper position and, preferably, I provide these tensioning means adjacent the closing edge of the inclosure. These tensioning means in the types of invention illustrated take the form of cooperating button elements provided respectively adjacent the upper edge of the door 3 and the lower edge of the inclosure. In the accompanying drawings I have provided the door 3 with a button head 17 and the inclosure with the cooperating button socket 18. This button fastener produces an effective stretch in the inclosure and holds the same in its proper position. The portion of the inclosure laterally of the door heading is also secured to the automobile body 1 at the front lower edge of the inclosure and beyond the hinge line by means of the button elements 19. It will be evident that the form of inclosure shown in Figure 1 can be stored flat, after it has been removed from the door 2, even if the rod 7 is not removed from the pocket 9, by turning the rod 7 in the bearing 12 of the tip section 8 so as to bring the offset 11 flush with the fabric 4. The transparency 6 may be subdivided as desired, to allow a folding of the inclosure to produce a small packet of the same in stored condition, the rod section 7 being removed from the pocket 9, if the inclosure is folded longitudinally in making this small packet.

Referring to the form of inclosure shown in Figures 2 and 3, the same shows the transparencies 6 so disposed that none of them include the longitudinal planes in which adjacent support rod section ends lie when they are released from supporting duty, said support rod sections being so vertically relatively movable as to free the abutting ends one from the other and provide space for the folding of the fabric 4 when the inclosure is doubled up longitudinally, each rod section being folded up with its own fabric section. Of course, inasmuch as there is no longitudinal strengthening rod provided in these types of inclosure, this inclosure shown in Figures 2 and 3 can also be folded vertically in a plane passing between the transparencies 6. In this form of inclosure shown in Figures 2 and 3, a lower rod section 20 and an upper rod section 21 are provided, the same being contained in the fabric pocket 9. The lower rod section 20 is received by the rectangular socket 22 formed in the door 3, by means of an offset rod portion 23 having a lower supporting end 24 of rectangular cross-section. This construction is similar to that shown in Figure 1, the offset 23 being provided because the rod slot or pocket 9 is formed along the closing, lapping edge of the inclosure, in the form illustrated, and the rod 20—21 is mounted upon the top of the door 3. Means must be provided for securing together the rod sections 20 and 21 to render them relatively rigid in the direction of their length when the inclosure is in use and these securing means are mounted upon one of the rod sections and inclose the abutting ends of the two rod sections. These securing means can be temporarily put out of commission, when it is desired to fold and store the inclosure, whereby the rod sections 20 and 21 can be separated and each folded up with the particular part of the fabric to which it belongs. These securing means, as shown in Figures 2 and 3, consist of a sleeve 25 formed with a shoulder 26 intermediate its ends, the sleeve in its upper portion being adapted to receive cylindrical rod section 21 of 5/16-inches diameter, for instance, and in its lower portion to receive cylindrical rod section 20 of ⅜-inches diameter, for instance, the sleeve 25 normally resting by means of its shoulder 26 upon the rod section 20. This disclosure is only one of many possible forms of such securing means and I have shown other forms thereof in my said Patent No. 1,620,003. The sleeve 25 is formed with a thin, flat actuating member 27 which extends through and from a vertical slit 28 formed in the rod pocket or slot 9, this slit being long enough to allow the sleeve 25 to be lifted off from the rod section 20, as illustrated in Figure 3, whereby the rod sections 20 and 21 are disengaged one from the other so that they may be folded up with the fabric 4 and transparencies 6 into a small door pocket package, if the folding is made in both directions, or into a narrow long body package, if the folding is made in a longitudinal direction only, the abutting ends of the rod sections 20 and 21 being spaced enough not to interfere with the longitudinal folding of the curtain, because a lower slit 29 which also is formed in the rod pocket 9 allows the rod section 20 to be dropped a limited amount, as plainly shown in Figure 3. In this form of inclosure shown in Figures 2 and 3, the same use, in combination, of a valance, upper support button elements and lower button tensioning elements, respectively, is made and in the same manner, as herebefore described with reference to these elements in Figure 1.

Also in the form of device shown in Figure 1, is provided the lower slit 29, which permits the raising and lowering of the offset rod portion 7 whereby to separate the said rod portion and the tip portion 8, if it is desired to remove the rod section 7 from the sheath pocket 9, the flexibility of the fabric 4 allowing for the insertion and withdrawal of the offset rod into and from the sheath pocket 9.

All of the claims of this application read upon the disclosure of Figure 1 and some of them read also upon the disclosure of Figures 2 and 3.

What I claim is:

1. In automobile inclosures of the fabric collapsible type adapted to be mounted upon the automobile door, the combination with suitable curtain fabric formed with a pocket, of a two piece supporting rod contained within the pocket, the lower rod section being formed with an offset, the upper rod section being formed with an enlarged head connected to the fabric so as to strengthen the latter and to prevent perforation of the fabric at the top of said rod section, means holding together the adjacent ends of said rod sections to maintain the latter relatively rigid in the direction of their length, said means allowing for the turning of the lower rod section relative to the upper section, means for supporting the hinge side of the curtain, and fabric tensioning means consisting of button elements secured to the fabric and adapted to cooperate with complementary button elements upon the automobile door.

2. In automobile inclosures of the fabric collapsible type adapted to be mounted upon the automobile door, the combination with suitable curtain fabric formed with a pocket, of an upper rod section formed with an enlarged head connected to the fabric adjacent the upper edge of the same, said upper rod section depending in said pocket, a lower rod section contained within said pocket and formed with an offset at its lower end, said upper rod section being provided with a bearing portion receiving the upper end of the lower rod section and allowing for the turning of the lower rod section relative to the upper section, said bearing portion and the contained upper end of the lower section serving to maintain said rod sections relatively rigid in the direction of their length, means for supporting the hinge side of the curtain, and fabric tensioning means consisting of button elements secured to the fabric and adapted to cooperate with complementary button elements upon the automobile door.

3. In automobile inclosures of the fabric collapsible type adapted to be mounted upon the automobile door, the combination with suitable curtain fabric formed with a pocket, of a rod tip formed with an enlarged head pivotally secured to the fabric adjacent the upper edge of the same, said rod tip depending in said pocket, a lower rod section contained within said pocket and formed with an offset at its lower end, said rod tip being formed with a bearing portion receiving the upper end of the lower rod section and allowing for the turning of the lower rod section relative to the upper tip section, said bearing portion and the contained upper end of the lower section serving to maintain said rod sections relatively rigid in the direction of their length, means for supporting the hinge side of the curtain, and fabric tensioning means consisting of button elements secured to the fabric and adapted to cooperate with complementary button elements upon the automobile door.

4. In automobile inclosures of the fabric collapsible type adapted to be mounted upon the automobile door, the combination with suitable curtain fabric formed with a pocket adjacent the closing edge, of a rod tip formed with an enlarged head pivotally secured to the fabric adjacent the upper edge of the same, said rod tip depending in said pocket, a lower rod section contained within said pocket and formed with an offset at its lower end, said rod tip being formed with a bearing portion receiving the upper end of the lower rod section and allowing for the turning of the lower rod section relative to the upper tip section, said bearing portion and the contained upper end of the lower section serving to maintain said rod sections relatively rigid in the direction of their length, the fabric pocket being formed with a slit allowing for the insertion and withdrawal of the offset rod into and from said pocket, respectively, means for supporting the hinge side of the curtain, and fabric tensioning means consisting of button elements secured to the fabric and adapted to cooperate with complementary button elements upon the automobile door.

Signed by me this 13th day of December, 1923.

GEORGE E. BISHOP.

CERTIFICATE OF CORRECTION.

Patent No. 1,818,294.             Granted August 11, 1931, to

GEORGE E. BISHOP.

It is hereby certified that error appears in the printed specification of the above numbered patent requiring correction as follows: Page 1, line 2, after "application" insert Serial No. 527,963, filed January 9, 1922 which matured into Patent No. 1,485,012 of February 26, 1924, and application; and that the said Letters Patent should be read with this correction therein that the same may conform to the record of the case in the Patent Office.

Signed and sealed this 22nd day of September, A. D. 1931.

(Seal)                                    M. J. Moore,
Acting Commissioner of Patents.